United States Patent [19]
Reesor

[11] Patent Number: 5,471,528
[45] Date of Patent: Nov. 28, 1995

[54] VOICE SWITCHED SPEAKERPHONE WITH FILTERS HAVING EXPONENTIAL TRANSFER FUNCTION IN THE MONITORING PATH

[75] Inventor: Gordon J. Reesor, Ottawa, Canada

[73] Assignee: Mitel Corporation, Kanata, Canada

[21] Appl. No.: 211,181

[22] PCT Filed: Sep. 25, 1992

[86] PCT No.: PCT/CA92/00412

§ 371 Date: Mar. 23, 1994

§ 102(e) Date: Mar. 23, 1994

[87] PCT Pub. No.: WO93/06679

PCT Pub. Date: Apr. 1, 1993

[30] Foreign Application Priority Data

Sep. 27, 1991 [CA] Canada .................................. 2052351

[51] Int. Cl.⁶ ..................................................... H04M 1/60
[52] U.S. Cl. ........................... 379/390; 379/389; 379/388
[58] Field of Search .................................... 379/387, 388, 379/389, 390, 395, 419, 420, 406

[56] References Cited

U.S. PATENT DOCUMENTS

| | | | |
|---|---|---|---|
| 3,963,868 | 6/1976 | Randmere et al. | 379/390 |
| 4,210,872 | 7/1980 | Gregorian | 330/9 |
| 4,293,820 | 10/1981 | Dinh | 330/85 |
| 4,315,227 | 2/1982 | Fleischer et al. | 333/173 |
| 4,715,063 | 12/1987 | Haddad et al. | 379/390 |
| 4,796,287 | 1/1989 | Reesor et al. | 379/390 |
| 4,879,745 | 11/1989 | Arbel | 379/389 |
| 4,891,837 | 1/1990 | Walker et al. | 379/390 |
| 4,989,242 | 1/1991 | Arnaud | 379/390 |
| 5,058,153 | 10/1991 | Carew et al. | 379/390 |
| 5,075,687 | 12/1991 | Chen et al. | 379/390 X |
| 5,199,065 | 3/1993 | Von Zitzewitz et al. | 379/389 |

Primary Examiner—Jeffery A. Hofsass
Assistant Examiner—Scott L. Weaver
Attorney, Agent, or Firm—Marks & Clerk

[57] ABSTRACT

A handsfree telephone circuit has separate transmit and receive audio paths for connection to a microphone and speaker respectively. The circuit comprises a controllable attenuator in each of said transmit and receive paths, an attenuator control responsive to control signals to set the attenuation level of said attenuators, and a separate monitoring circuit connected to each of said transmit and receive paths for sensing audio signals therein. Each monitoring circuit comprises a filter for band limiting the audio signals, a peak level detector receiving said band limited signals, and a speech detector for distinguishing speech from background noise. A switching comparator compares the outputs of the peak level detectors in the two monitoring circuits and produces directional control signals for said attenuator control means to determine which audio path has control. The circuit eliminates "hollow" effect in the speech due to bandlimiting filtering in the audio paths.

10 Claims, 6 Drawing Sheets

VOICE SWITCHED SPEAKERPHONE WITH FILTERS HAVING EXPONENTIAL TRANSFER FUNCTION IN THE MONITORING PATH

This invention relates to telephones, and more particularly to a handsfree circuit for use in a telephone set.

BACKGROUND OF THE INVENTION

A conventional telephone hand set operates in the full duplex mode, which means that the parties can transmit and receive at the same time. This is possible because a conventional hand set is designed to have minimal acoustic coupling between the speaker and microphone. A handsfree system, which allows the user to operate the telephone without a hand set, has difficultly operating in the full duplex mode because of the high degree of acoustic coupling between the microphone and loud speaker. Most handsfree systems are therefore operated in the half duplex mode, which means that some form of switching must be provided in the transmit and receive paths.

In a conventional handsfree circuit, variable complementary loss attenuators are inserted in the transmit and receive paths. These are controlled in accordance with the audio signals in the two paths. Level detectors determine the overall noise level in the respective paths and speech detectors distinguish between background noise, which is assumed to be a generally constant level, and speech, which is generally characterized by short bursts of higher level audio. One example of such a system is described in U.S. Pat. No. 4,490,582.

Prior art designs have generally required filters in the transmit and/or receive audio paths to band limit the speech path to the 400 to 3500 Hz region. These filters are required to reduce background noise other heavy machinery, but they create a "hollow" effect that degrades the quality of the transmitted sound.

A further problem with the prior art circuits stems from the fact that the speech detectors work by detecting short bursts of sound. Consequently, many prior art circuits will respond to intermittent background noise, such as typing, causing the attenuators to ramp up to the full transmit state when no speech is present.

Yet another problem with the prior art design is the frequent presence of echo signals due to trans-hybrid reflection or reverberation in the room. Peak detector decay rate is made long so as to prevent reverberation echo from causing the handsfree to switch states.

An object of the present invention is to alleviate the aforementioned problems with the prior art.

SUMMARY OF THE INVENTION

According to the present invention there is provided a handsfree telephone circuit with separate transmit and receive audio paths for connection to a microphone and speaker respectively, comprising a controllable attenuator in each of said transmit and receive paths; attenuator control means responsive to control signals to set the attenuation level of said attenuators; a separate monitoring circuit defining respective monitoring paths connected to each of said transmit and receive paths for sensing audio signals therein, each said monitoring circuit comprising a filter in the associated monitoring path for band limiting said audio signals, a rectifier, a peak level detector receiving said band limited signals, and a speech detector for distinguishing speech from background noise; and a switching comparator for comparing the outputs of the peak level detectors in the two monitoring circuits and producing directional control signals for said attenuator control means to determine which audio path has control thereof.

Preferably, a fast attack filter with a slow decay rate is provided in each of the input paths of the switching comparator. The filter in the non-controlling path can be bypassed so that the tendency of the switching comparator to switch on echo signals in the non-controlling path is reduced because the envelope from the filter in the controlling path extends beyond the echo signals in the non-controlling path.

The filter in the audio paths is preferably a second order biquad filter. The general $2^{nd}$ order Z-domain transfer function is as follows:

$$Y_{(z)}/X_{(z)} = G(1 + A_1 Z^{-1} + A_2 Z^{-2})/(1 - B_1 Z^{-1} - B_2 Z^{-2})$$

where G is the gain, $A_1$, $A_2$, $B_1$, $B_2$ are constants that define the filter function.

The preferred values of G, A, $A_1$, $A_2$, $B_1$, $B_2$ are as follows:
G=0.2054
$A_1$=−1.9911
$A_2$=+1.0000
$B_1$=+1.6067
$B_2$=−0.67222

The use of the second order biquadratic filter in the control path that senses the transmit and audio signals allows the audio paths to use a wider band width (200 Hz to 3500 Hz) and thus avoid the "hollow" effect that band limiting creates in a prior art circuit with a filter directly in the audio paths.

The attenuators are preferably in the form of digital attenuators having three stable states, namely idle, and full transmit and full receive states, and a number of intermediate transient states through which the attenuators are ramped between the stable states. Each intermediate state is preferably separated by an attenuation of 1.5 dB, and the attenuators are preferably ramped up between the intermediate states at the rate of one state every 0.5 milliseconds when going from the idle to the fully "on" state. The attenuators decay slowly back to the idle states, taking 1 or 2 seconds in the absence of speech signals. The ramp time in the decay direction is programmable.

The peak detectors follow the envelope of the filter outputs, after being rectified. A fast attack and decay rate is used. If the speech detectors are triggered momentarily by short deviations in background noise, such as may be caused by typing at the keyboard, the peak detector output will decay back to the average noise level faster than the attenuators can swing to the full transmit state. Thus, although the attenuators might start to swing on a noise spike, they will return to the correct state more quickly than prior art circuits that have a long exponential rate of decay for the peak detectors.

The invention will now be described in more detail, by way of example only, with reference to the accompanying drawings, in which:

DESCRIPTION OF THE PREFERRED EMBODIMENT

Figure 1:
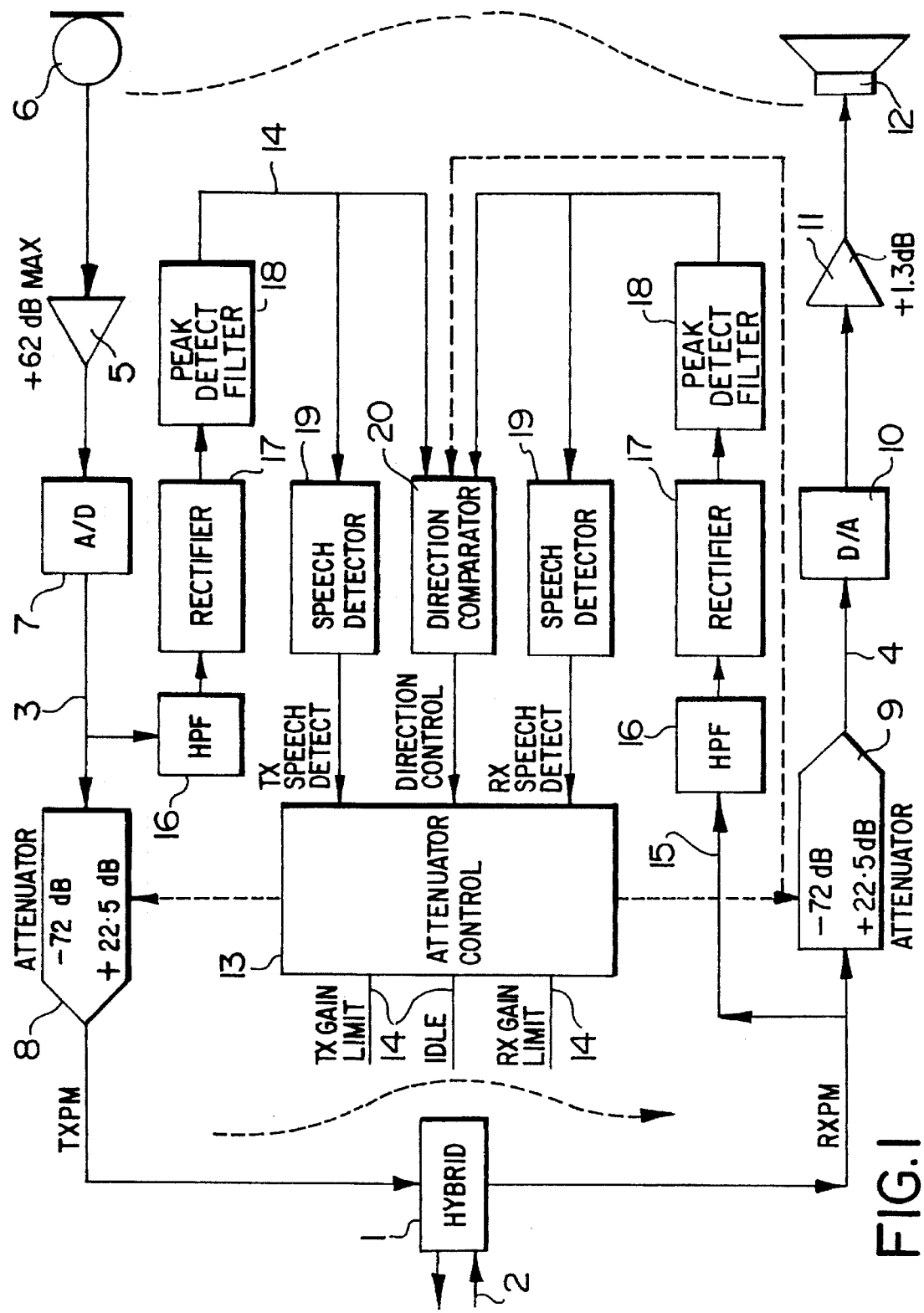
FIG. 1 is a block diagram of a handsfree telephone circuit in accordance with the invention.

Referring now to FIG. 1, the handsfree circuit comprises a two-to-four wire hybrid 1 connected to a full duplex telephone line 2 on one side and on the other side to respective transmit and receive paths 3, 4.

The transmit path 3 includes an amplifier 5 connected to a microphone 6, an analog-to-digital converter 7, and a variable loss attenuator 8. The receive path 4 also includes a variable loss attenuator 9, a digital-to-analog converter 10 and an amplifier 11 connected to a speaker 12.

Each attenuator 8, 9 has sixty-four states separated by 1.5 dB loss. The attenuators 8, 9 are controlled by an attenuator control unit 13 in a complementary fashion so that as the loss introduced by one attenuator is decreased, the loss introduced by the other attenuator is increased by a corresponding amount. The attenuators 8, 9 have three stable states, namely an idle, and a full transmit and a full receive state having respectively minimum, intermediate and maximum loss. The losses introduced by the attenuators in these states can be preset by gain control inputs 14 to the attenuator control unit 13.

The transmit and receive paths, 3, 4 are associated with respective separate monitoring circuits 14, 15 connected upstream of the attenuators 8, 9 to monitor audio signals in the paths 3, 4. Each monitoring circuit 14, 15 comprises a high pass filter 16, a rectifier 17, a peak level detector 18, and a speech detector 19. The monitoring paths are also connected to a common direction control comparator 20 which determines which audio path has control of the attenuator control unit 13.

Figure 2:
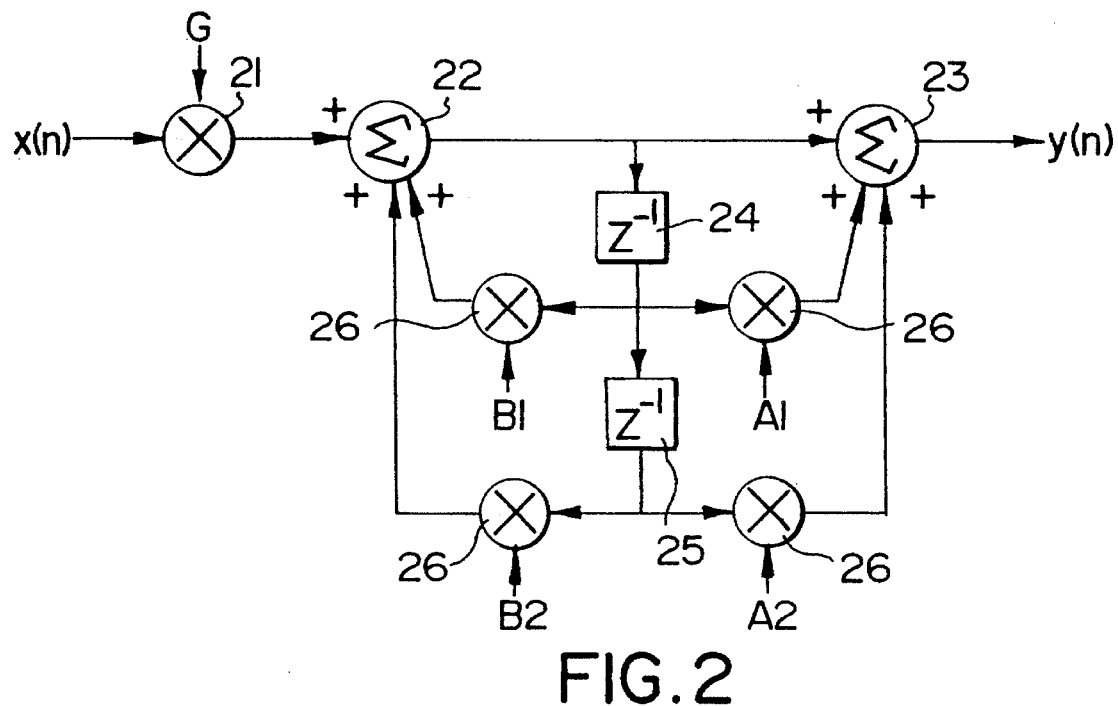
FIG. 2 is a block diagrammatic representation of a second order biquadratic digital high pass filters.

Each high pass filter 16 comprises a second order biquadratic digital filter as shown in more detail in FIG. 2. The filter, which has a programmable transfer function uses default filter coefficients for a high pass filter with a −3 dB point at 400 Hz. This default filter ensures that the circuit will work reliably in environments with a large amount of low frequency background noise. The filter comprises a multiplier 21, adders 22 and 23, further multipliers 26 and linear filters 24 and 25. The result of the circuit shown in FIG. 2 is to implement the equation:

$$Y/X = G(1 + A_1 Z^{-1} + A_2 Z^{-2})/(1 - B_1 Z^{-1} - B_2 Z^{-2})$$

where G, A1, A2, B1 and B2 are constants having values as follows:
G: +0.2054 (−12 dB passband)
A1: −1.9911
A2: +1.0000
B1: +1.6067
B2: −0.6722

The values of the gain G are separately programmable for the Rx and Tx monitoring circuits. The default values are for the filter to have an attenuation of 12 dB in the passband for both circuits.

Figure 3:
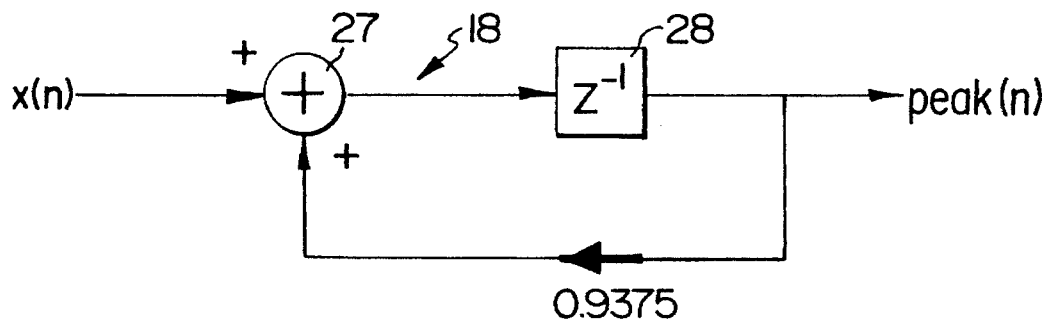
FIG. 3 is a block diagram of a peak detector filter.

The rectified output of the high pass filter 16 is fed to a peak detector filter, shown in more detail in FIG. 3. This comprises an adder 27 and first order digital filter 28. The peak detector responds quickly to a rectified input signal |y(n)|, which has been attenuated by 12 dB in the filter 16.

Figure 4:
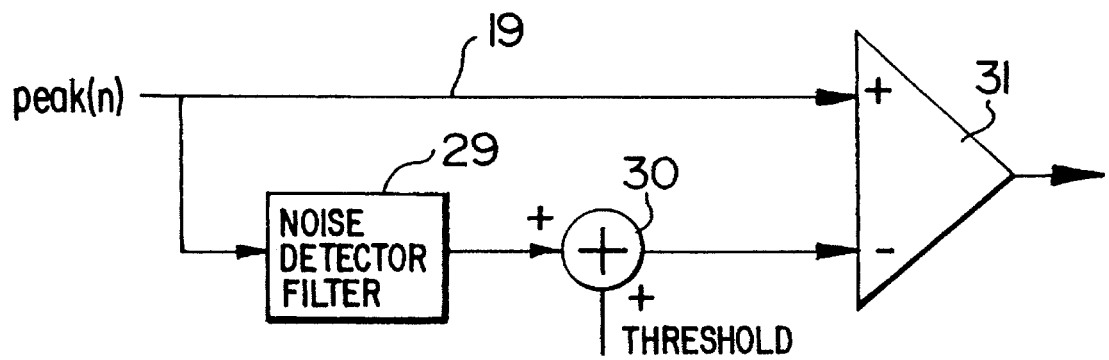
FIG. 4 is a block diagram of a speech detector comparator.

The speech detector 19, shown in more detail in FIG. 4, comprises a noise detector filter 29, an adder 30 and a comparator 31. The noise detector filter 29, shown in more detail in FIG. 5, comprises an adder 32, an adder 33, and a first order digital filter 34. The comparator produces a high output only when peak detector output is higher than the long-term average noise level. The threshold level is programmable.

Figure 6:
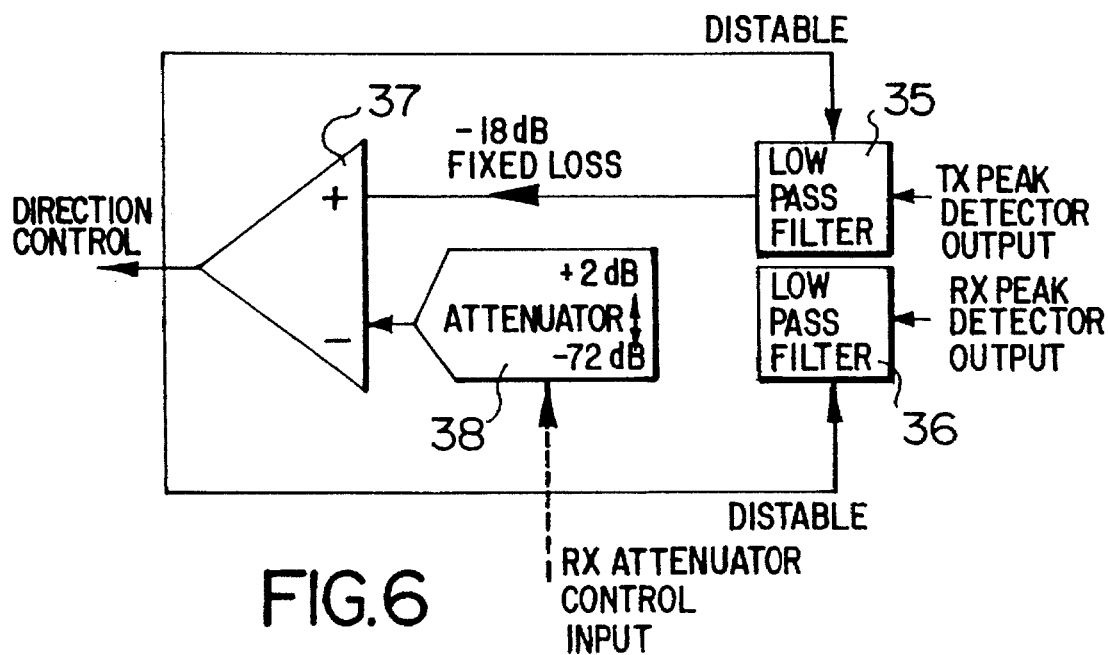
FIG. 6 is a block diagram of a detection comparator.
Figure 7:
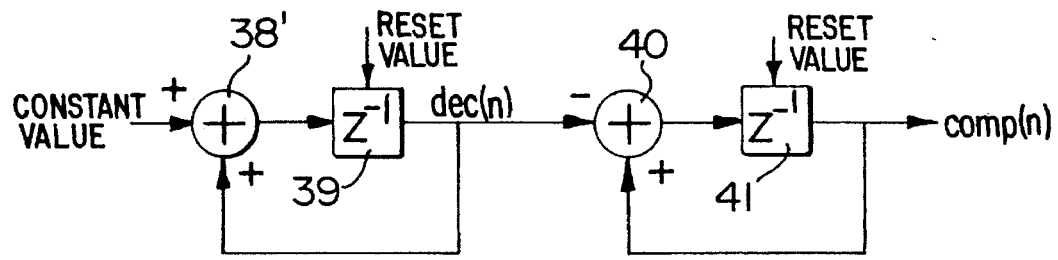
FIG. 7 is a block diagram of a comparator low pass filter.
Figure 9:
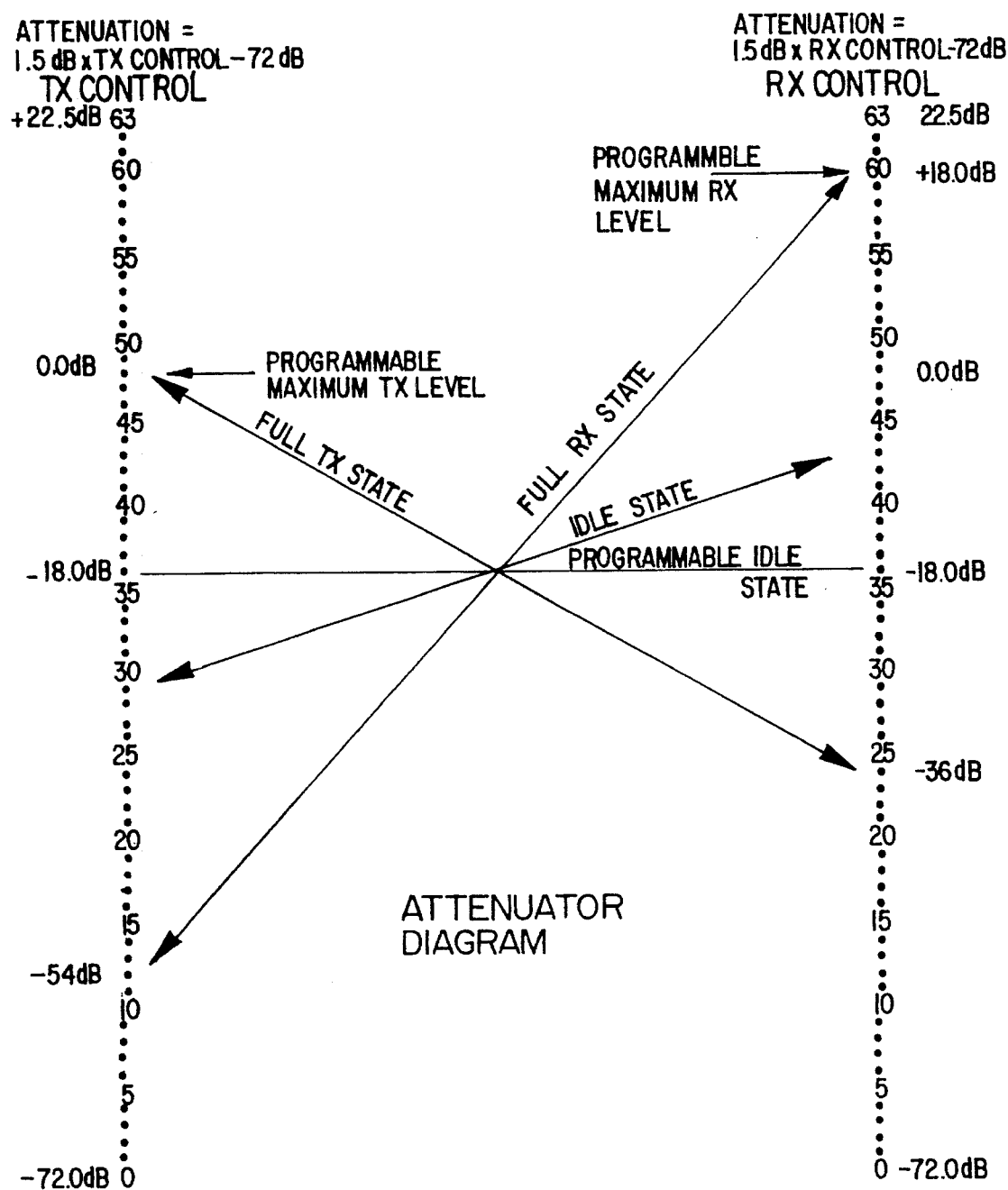
FIG. 9 is an attenuator state diagram.

The direction control comparator is shown in more detail in FIG. 6. The outputs of the peak detector filters 18 are fed to respective low pass filters 35, 36, which have a fast attack and slow decay having an inverted exponential form, as shown in FIG. 9 for reasons that will be described in more detail below. The filter 35 in the transmit path Tx is connected to the non-inverting input comparator 37, and the filter 36 in the receive path Rx is connected through a variable attenuator 38 to the inverting input of the operation amplifier 37. The low pass filters 35, 36 are shown in more detail in FIG. 7. A constant is added at 38 to register 39 (dec(n)) to produce a linearly increasing value dec(n) which is subtracted from register 40 complemented with subtractor 41. When a reset occurs, register 40, which is shown as $Z^{-1}$, is loaded with peak(n) and register 39 is cleared to zero. This creates the inverted exponential decay function of comp(n).

Referring again to FIG. 1, the signals on the full duplex line 2 are assumed to be digital. The hybrid 1 provides an interface between the half duplex handsfree circuit and full duplex line 2. The hybrid 1 will also include D/A and A/D converters since the full duplex line 2 is analog. Incoming signals are directed from the line 2 into the receive path 4 and outgoing signals are directed from the transmit path 3 into the line 2. In the case of the Rx signals, they are attenuated by an amount determined by the setting of the attenuator 9 prior to digital-to-analog conversion and amplification before they are applied to the speaker 12. When the handsfree circuit is in the full receive mode, i.e. with the Rx path in control, the attenuator 9 will be set for minimum loss so as to allow the incoming signals to pass through.

Similarly, the outgoing signals are passed through amplifier 5, analog-to-digital converter 7, and attenuator 8, which operates in a manner complementary to the attenuator 9. When the circuit is in the transmit mode, i.e. with the transmit path in control, the attenuator 8 is set for minimum loss and the attenuator 9 is set for maximum loss. In the idle state, when no speech is present, both attenuators are set for midgain.

Figure 10:
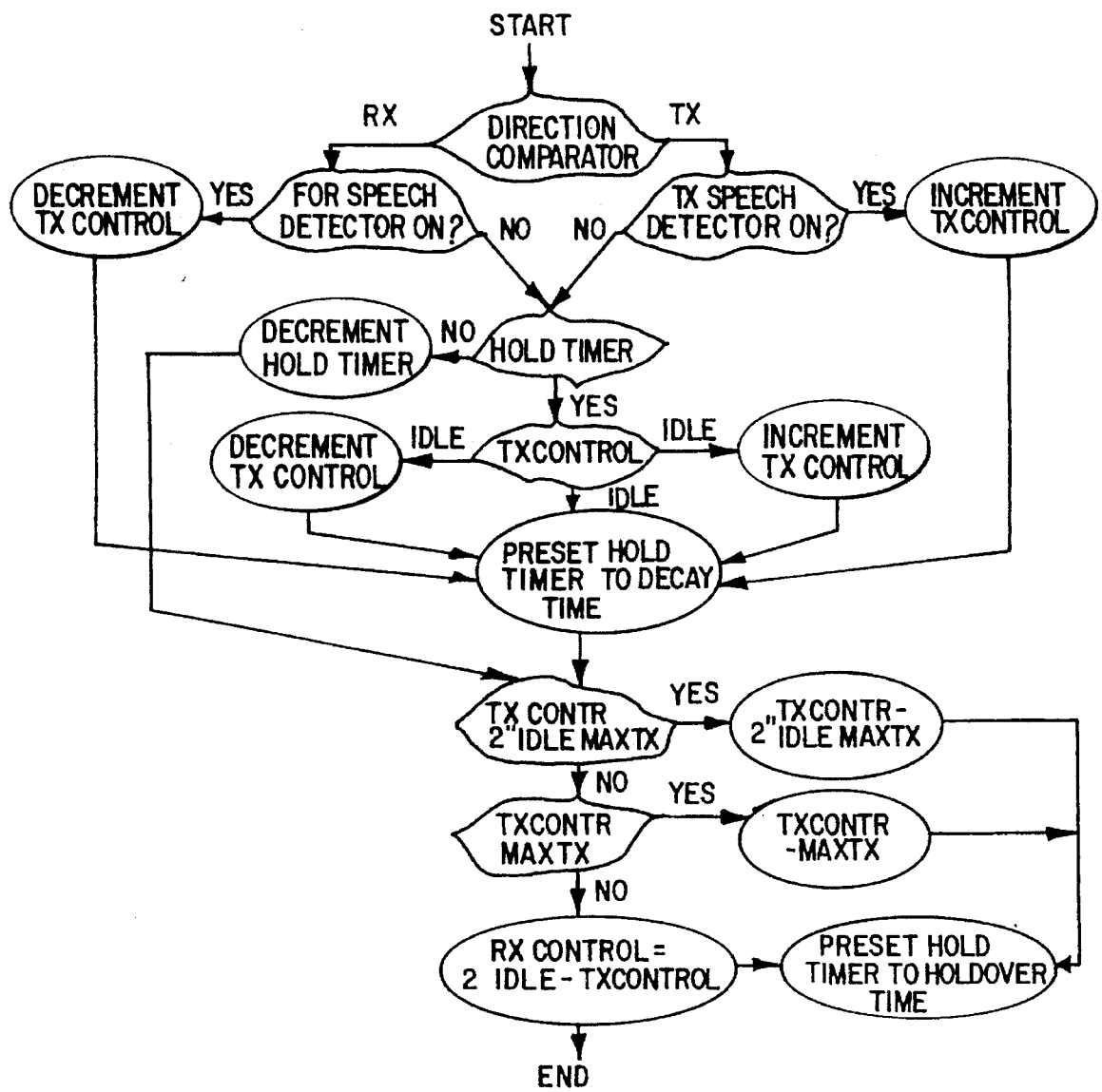
FIG. 10 is a flow chart showing the attenuator control algorithm.

A full state diagram of the attenuators 8, 9, is shown in FIG. 9. Each attenuator has 64 states, each separated by 1.5 dB gain/loss. Three of the states are stable, namely full transmit, full receive, and idle, when no speech is detected on either path. The stable states are programmable in accordance with system requirements. The attenuators are controlled in accordance with the flow chart shown in FIG. 10.

The attenuator control unit 13 provides 6 bit gain control output to the $T_x$ and $R_x$ attenuators 8, 9. These 6 bit controls select one of 64 possible gains, on the ramp which are 1.5 dB apart giving a maximum range of 64 steps of 1.5 dB.

Of the 64 possible attenuator gain states, the speakerphone will rest in only one of the three stable states (Full-Tx, IDLE, or Full-Rx). During a transition from idle to a full state, or full state to full state, the attenuators 8, 9 pass through the other states at a fixed rate of 1.5 dB every 0.5 millisecond. A full-state to idle-state transition is timed by two programmable timers (not shown); the "HOLD-OVER" timer and the "RAMP-DOWN" timer. The "HOLD-OVER" timer allows the attenuators to hold a full state level for a length of time determined by the time preset value before starting a slow decay to idle state, and the ramp down timer allows the slow decay rate to be programmed.

The IDLE, MAXTX and MAXRX levels (FIG. 9) are stored in programmable registers (not shown) which may be programmed by an external microprocessor (not shown). The choice of an IDLE level will affect the overall loop attenuation of the speaker-phone. User control of the speaker volume can be adjusted over the full range of the Rx attenuator by changing the contents of the Rx gain control register. The value written to the Rx gain control register is used to limit the maximum positive swing of the attenuator (MAXRX). This feature allows the speaker-phone to operate "closer to full duplex" at low speaker volume settings because the attenuators will not have to swing so far.

The maximum gain of the Tx speech path may also be programmed over the full range of the Tx attenuator with the Tx gain control register. (MAXTX). The following are some recommended restrictions for the Txgain, and IDLE registers:

1. The positive gain range of the Tx attenuator should be used for optimum noise performance in the transmit path.

0<=TXGAIN<=48 (base 10)

2. The following restriction applies to the Rx gain setting:

0<=RXGAIN<=63 (base 10)

3. The following restrictions apply to the IDLE state setting:

(2*IDLE–RXGAIN)>=0

(2*IDLE–TXGAIN)>=0

The control inputs to the attenuator control unit 13 that cause the attenuators 8, 9 to change state are derived from the monitoring circuits 14, 15, which set the audio signals in the speech paths 3,4. There are two types of control signal, namely the signals from the speech detectors 19 that cause the attenuators 8 to ramp rapidly to the full state, and the direction control signals from comparator that determine which audio path controls the attenuator control unit 13 at any given time.

The sensed audio signals are first fed through the second order high pass filter 16, which is programmable, but which has a default response, which is high pass and a minus 3 dB point at 400 Hz. This frequency response ensures that the speech detector 19 and switching comparator 20 work reliably in environments with large amounts of low frequency noise, such as fans and other machinery, as well as with analog trunk hybrids that reflect low frequency components. The default value for the gain G in both the Tx and Rx paths, is 12 dB, but the values for G in each of the paths can be programmed separately. It is preferable not to have a gain more than 12 dB because of word length effects inside the filter.

Figure 8:
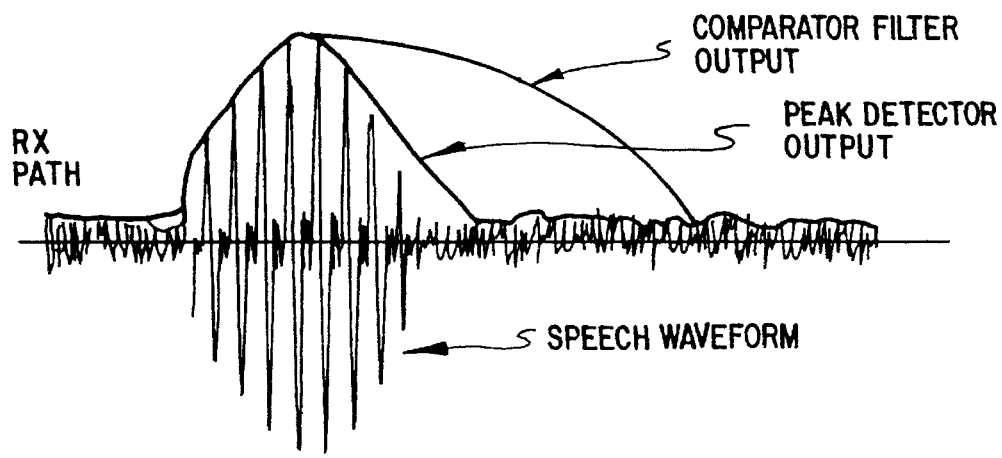
FIG. 8 is a diagram showing the output wave forms of the audio signals.
Figure 8:
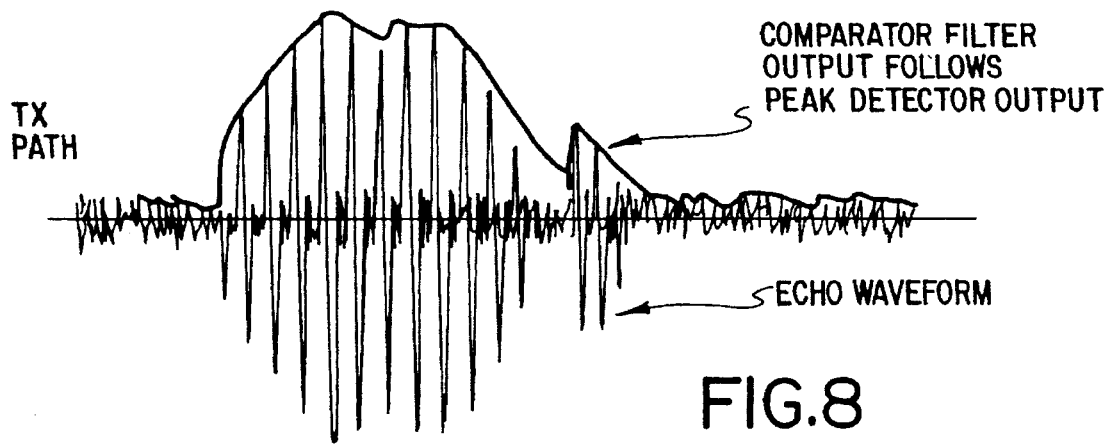

The peak level detectors 18 produce an output signal representing the envelope of the waveform of the filtered audio signals, as shown in FIG. 8. The peak detector registers 28 are updated once every 125 microseconds and thereby represent the short term average audio level. The detector responds immediately to a rectified input signal |y(n)|, which has been attenuated by at least 12 dB in the second order filter. The rate of decay is exponential, with the time constant being, for example, in the order of 2 milliseconds.

The speech detectors 19 compare the peak detector output with the noise level tracked by the noise level detector 29 (FIG. 4), which tracks the average noise level at the output of the peak detector 18. The comparator output is only high, indicating speech present, when the peak detector is higher than a long term average noise level plus a programmable threshold level, which can be used to control the sensitivity of the speaker phone to deviations in background noise level.

The noise level filter 29 takes the long term average of the background noise level of the peak detector filter output. If the peak detector output is lower than the noise level filter, the noise level filter decays slowly toward the peak detector output, with a time constant of about 16 seconds. If the peak detector output is higher than the noise filter output, the filter output increments linearly with a full scale time constant of 1,024 seconds. These long time constants are necessary to ensure that the noise level average is not moved significantly by speech present at the peak detector output.

Figure 5:
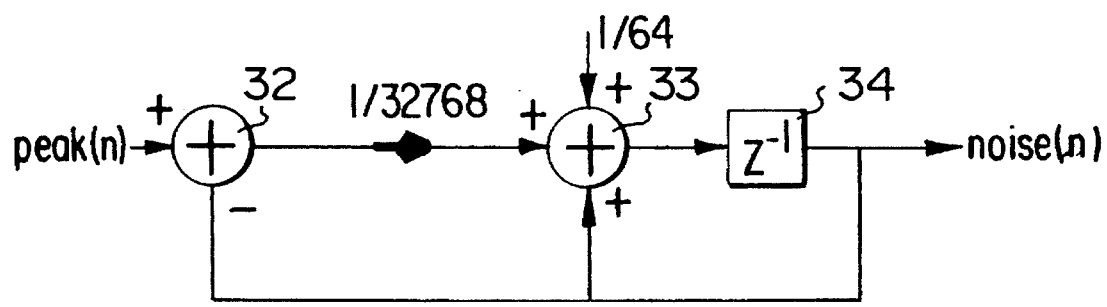
FIG. 5 is a block diagram of a noise level detector filter.

The noise level filter shown in FIG. 5 takes the difference between peak(n) and noise(n) and scales the result down by 15 bits. If peak n minus noise n is negative, then the result after scaling down is always minus 1 (since 16 bit twos complement arithmetic is used). If peak n minus noise n is positive, then the result is always 0. This yields the desired results since the attack time has to be made very slow. The slow attack time constant is accomplished with the second adder 33, which always adds 1 over 64. this is done by adding 1 every 64 sample periods. Since the attack time constant is so long, the initial value for the noise filter output (at time T=0) is set to a large positive level to prevent start up problems.

Direction control is determined by the direction comparator 20, which compares the outputs of the peak detectors 18. Two types of hysteresis are built in. First, depending upon the state of the comparator output, one of the two comparator input signals will be low pass filtered, and second the relative levels of the peak outputs are varied according to the state of the Tx and Rx attenuators.

The low pass filter tends to extend the decay time of the peak detector signal in order for the comparator to hold on longer to the direction that it is currently switched to. For example, assuming that the Tx peak detector output is large enough to switch the comparator to the Tx direction (positive output), this positive output is used to disable the low pass filter on the Rx peak detector signal and enable the filter on the Tx peak detector signal. This effect allows the Tx peak detector to follow the speech envelope closely without requiring a long decay time, while still preventing the direction comparator from switching inadvertently to the Rx direction on an echo or reflection from an analog trunk interface. This hysteresis is even more important when the comparator switches to the Rx direction. Because of acoustic reverberation, the Rx signal that is sent to the speaker will appear in the Tx path at a much higher level and delayed in time. The slow decay time of the low pass filter and the effect of switching the low pass filters on and off, prevents acoustic reverberation of Rx speech from switching the comparator to the Tx direction.

The secondary hysteresis effect is caused by the variable attenuator 38 in the Rx control path (shown in FIG. 6).

Depending upon the state of the attenuator in the Rx speech path, the maximum level of a reverberation signal in the Tx path can be deduced. For example when the Rx attenuator is in full receive mode (maximum volume) the attenuator in the Rx control path (to the −ve input of the direction comparator) is also at a maximum volume level which is identical to the Rx attenuator. Conversely when the Tx attenuator is in full Tx mode, the Rx attenuator is at a minimum level and so is the attenuator in the Rx control path. This produces a hysteresis effect on the comparator which makes it gradually harder for the opposing speech path to take control depending upon how far the attenuators are from the idle state.

When the attenuators are in idle state, the two inputs to the direction comparator should be roughly balanced. This balance may be changed by modifying the gains of the High Pass Filter sections (HPF) in the control paths.

Referring again to FIG. 8, the diagram shows an example speech signal being transmitted in the RX speech path, and the resulting echo waveform in the Tx path due to acoustic coupling from speaker to microphone. The peak detector filter follows the envelope of the signal closely with a fast decay rate. This fast decay rate is useful so that the speech detectors will only be triggered momentarily by short deviations in background noise. If a noise spike is shorter than a few milliseconds, the peak detector output will decay back to the average noise level faster than the attenuators can swing to a full-on state. The "HOLD-OVER" timer is not preset until the attenuator reaches the full-on state, therefore this makes the switching insensitive to large (but short) deviations in background noise. Although the attenuators might start to deviate on a noise spike, they will return to the correct state more quickly than prior art algorithms, that have a long exponential or linear rate of decay for peak detectors.

FIG. 8 also shows the comparator filter output for the Rx path. The decay characteristic of this filter, which is of approximately inverted exponential form, prevents the echo waveform in the Tx path from causing a switch to Tx after the Rx signal disappears. The comparator filter output in the Tx path is forced to follow the Tx peak detector output until the switching comparator switches to Tx.

The various state constants can be stored in 16 bit registers as follows:

Tx Speech Detector Threshold

Default value
'01C0h'
Address 22h

This register is used by the handsfree program as a threshold level for the speech detector comparators.

RX Speech Detector Threshold

Default value
'00E0h'
Address 23h

This register is used by the handsfree program as a threshold level for the speech detector comparators.

IDLE State Register

Default value
'0026h'
Address 24h

This register is used to program the idle state level for handsfree operation. Bits (b5 to b0) in this register represent a number referred to as "IDLE" in the formula below.

Idle level (in dB)=(1.5 dB×IDLE)−72 dB.

Comparator Decrement Constant

Default value
'0004'
Address 25h

This register is used to program the decay rate of the comparator low pass filters.

Ramp-out Timer Register

Default value
'00A0'
Address 26h

This register is an 8 bit binary number used by the handsfree program as a timer present value to program the ramp-out (ramp-down time) of the attenuators when decaying back to idle state.

Decay time per 1.5 dB attenuator step=(timer present value)×(0.5 msec)

Hold-over Timer Register

Default value
'0190h'
Address 27h

This register is an 8 bit binary number used by the handsfree program as a timer preset value to program the hold-over time of the attenuators. This is the length of time that the attenuator holds full state before starting to ramp down to idle state.

Tx High Pass Filter Gain Register

Default value
"0350h"
Address 28h

This register is used to program the gain of the digital filter in the voice detector path.

RX High Pass Filter Gain Register

Default value
'0350h'
Address 29h

This register is used to program the gain of the digital filter in the voice detector path.

Filter Coefficient A1 Register

Default value
'E024h'
Address 2Ah

This register is used to program the A1 coefficient in the HPF.

Filter Coefficient A2 Register

Default value
'1000h'
Address 2Bh

This register is used to program the A2 coefficient in the HPF.

Filter Coefficient B1 Register

Default value

'19C0h'

Address 2Ch

This register is used to program the B1 coefficient in the HPF.

Filter Coefficient B2 Register

Default value

'F540h'

Address 2Dh

This register is used to program the B2 coefficient in the HPF.

The above described circuit has a good tolerance to intermittent background noise and does not suffer to the same extent as prior art circuits from a hollow sound due to band limiting of the speech signals. The use of the special filter design in the directional control comparator minimizes switching on echo signals or reverberation.

I claim:

1. A handsfree telephone circuit with separate transmit and receive audio paths for connection to a microphone and speaker respectively, comprising a controllable attenuator in each of said transmit and receive paths; attenuator control means responsive to level control signals for incrementally setting the attenuation level of said attenuators, said control means responsive to a directional control signal for determining which audio path at any moment is a controlling path having control of said attenuators and which audio path is a non-controlling path; a pair of monitoring circuits for generating said level control signals, said monitoring circuits defining respective monitoring paths connected to each of said transmit and receive paths for sensing audio signals therein, each said monitoring circuit comprising a high pass filter for attenuating background noise, a rectifier, a peak level detector, and a speech detector; a pair of low pass filters having a fast attack and slow decay with a transfer function of approximately inverted exponential form connected to the outputs of the respective peak level detectors in the two monitoring circuits; and a switching comparator for comparing the outputs of said low pass filters to produce said directional control signal for said attenuator control means; and means for disabling the low pass filter receiving the output of the peak detector in the non-controlling audio path, the output of said low pass filter in the controlling audio path preventing the switching comparator from outputting the directional control signal upon echo signals appearing in the non-controlling path.

2. A handsfree telephone circuit as claimed in claim 1, wherein the output of one of said low pass filters is fed to said switching comparator through an incrementally variable attenuator that tracks the attenuation level of the attenuator in the audio path whose peak level detector is connected to said one low pass filter so as to produce a hysteresis effect that gradually reduces the sensitivity of the switching comparator to a signal in the non-controlling audio path as the attenuators move toward maximum and minimum gain respectively.

3. A handsfree telephone circuit as claimed in claim 2, wherein said variable attenuator is connected to the low pass filter connected to the peak level detector in the monitoring path connected to the receive path.

4. A handsfree telephone circuit as claimed in claim 1 wherein the high pass filter in each monitoring circuit is a second order biquad filter.

5. A handsfree telephone circuit as claimed in claim 4, wherein the second order biquad filter has the following Z-domain transfer function:

$$Y_{(z)}/X_{(z)} = G(1+A_1Z^{-1}+A_2Z^{-2})/(1-B_1Z^{-1}-B_2Z^{-2})^1$$

where G is the gain, and $A_1$, $A_2$, $B_1$, $B_2$ are constants.

[1] Please note square brackets have been changed to curved brackets.

6. A handsfree telephone circuit as claimed in claim 1, wherein each said attenuator has three stable states, which are a maximum gain state, a minimum gain state, and an idle state of gain intermediate said maximum and minimum gain states; and a plurality of intermediate transient states through which said attenuators pass stepwise during a transition between any of the stable states.

7. A handsfree telephone circuit as claimed in claim 1, wherein said attenuator control means causes said attenuator in the controlling audio path to ramp rapidly to the maximum gain state and said attenuator in the non-controlling audio path to the minimum gain state when speech is detected in the controlling audio path and to ramp more gradually back to the idle state in the absence of speech in the controlling audio path.

8. A handsfree telephone circuit as claimed in claim 6, wherein said intermediate states are separated by a fixed attenuation of 1.5 dB.

9. A handsfree telephone circuit as claimed in claim 6, further comprising means for presetting the attenuation level of each of said attenuators in said stable states.

10. A handsfree telephone circuit with separate transmit and receive audio paths for connection to a microphone and speaker respectively, comprising a controllable attenuator in each of said transmit and receive paths; attenuator control means responsive to level control signals for setting the attenuation level of said attenuators and directional control signals for determining which audio path has control of said attenuators; pair of monitoring circuits for generating said level control signals, said monitoring circuits defining respective monitoring paths connected to each of said transmit and receive paths and for sensing respective audio signals therein, each said monitoring circuit comprising a high pass filter for attenuating background noise, a rectifier, a peak level detector, and a speech detector; and a switching comparator for comparing the outputs of the peak level detectors in the two monitoring circuits and producing said directional control Signals for said attenuator control means; wherein said filter in each monitoring path is a second order biquad filter having the following Z-domain transfer function:

$$Y_{(z)}/X_{(z)} = G(1+A_1Z^{-1}+A_2Z^{-2})/(1-B_1Z^{-1}-B_2Z^{-2})$$

where G is the gain, and $A_1$, $A_2$, $B_1$, $B_2$ are constants, and where G, $A_1$, $A_2$, $B_1$, $B_2$ have the following approximate values:

G=0.2054

$A_1$=−1.9911

$A_2$=+1.0000

$B_1$=+1.6067

$B_2$=−0.67222.

\* \* \* \* \*